(12) United States Patent
Washnock et al.

(10) Patent No.: US 12,583,503 B2
(45) Date of Patent: **\*Mar. 24, 2026**

(54) ROTARY STEERING SYSTEMS

(71) Applicant: Ford Global Technologies, LLC, Dearborn, MI (US)

(72) Inventors: Joseph Washnock, Canton, MI (US); Jackson E. Barry, Dearborn, MI (US); James Philip Cooper, Milford, MI (US); Daniel Steven Payne, Southgate, MI (US)

(73) Assignee: Ford Global Technologies, LLC, Dearborn, MI (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/789,027

(22) Filed: Jul. 30, 2024

(65) Prior Publication Data

US 2024/0425102 A1    Dec. 26, 2024

Related U.S. Application Data

(63) Continuation of application No. 18/340,647, filed on Jun. 23, 2023, now Pat. No. 12,077,219.

(51) Int. Cl.
| | |
|---|---|
| *B62D 3/08* | (2006.01) |
| *B62D 3/12* | (2006.01) |
| *B62D 5/04* | (2006.01) |

(52) U.S. Cl.
CPC ............. *B62D 3/08* (2013.01); *B62D 5/0421* (2013.01); *B62D 5/0454* (2013.01)

(58) Field of Classification Search
CPC .......... B62D 3/08; B62D 5/04; B62D 5/0421; B62D 5/0454

(Continued)

(56) References Cited

U.S. PATENT DOCUMENTS

| | | | |
|---|---|---|---|
| 3,868,888 A | 3/1975 | Rehfeld | |
| 3,893,528 A | 7/1975 | Rehfeld | |

(Continued)

FOREIGN PATENT DOCUMENTS

| | | |
|---|---|---|
| CN | 203946160 U | 11/2014 |
| CN | 107176203 A | 9/2017 |

(Continued)

OTHER PUBLICATIONS

Description Translation for EP 2450257 from Espacenet (Year: 2012).\*

(Continued)

*Primary Examiner* — Jason D Shanske
*Assistant Examiner* — Daniel M. Keck
(74) *Attorney, Agent, or Firm* — Lorne Forsythe; Hanley, Flight and Zimmerman, LLC

(57) ABSTRACT

Rotary steering systems are disclosed. An example steering apparatus includes an input shaft including an input gear, an output gear fixed to an output shaft, a pitman arm coupled to the output shaft, the pitman arm to couple to a drag link to turn wheels of a vehicle as the output shaft rotates, an intermediate gear set including a first intermediate gear and a second intermediate gear, the first intermediate gear in contact with the input gear, the second intermediate gear in contact with the output gear, the first intermediate gear to rotate with the input gear, the second intermediate gear to rotate with the first intermediate gear, the output gear to rotate with the second intermediate gear.

20 Claims, 11 Drawing Sheets

(58) Field of Classification Search
USPC .......................................................... 74/498
See application file for complete search history.

(56) References Cited

U.S. PATENT DOCUMENTS

| | | | |
|---|---|---|---|
| 5,267,625 | A | 12/1993 | Shimizu |
| 5,341,701 | A | 8/1994 | Krom et al. |
| 5,482,131 | A | 1/1996 | Cortes Guasch et al. |
| 6,505,702 | B1 | 1/2003 | Shinmura |
| 6,810,985 | B1 | 11/2004 | Budaker et al. |
| 8,360,197 | B2 | 1/2013 | Escobedo et al. |
| 8,567,554 | B2 | 10/2013 | Zaloga et al. |
| 9,346,490 | B2 | 5/2016 | Washnock et al. |
| 9,975,573 | B2 | 5/2018 | She et al. |
| 10,421,481 | B2 | 9/2019 | Wilske et al. |
| 11,345,396 | B2 | 5/2022 | Cartwright et al. |
| 11,465,673 | B2 * | 10/2022 | DeHoff ................ B62D 5/0448 |
| 2007/0083326 | A1 | 4/2007 | Jo et al. |
| 2007/0089926 | A1 | 4/2007 | Jo et al. |
| 2012/0241243 | A1 | 9/2012 | Zaloga et al. |
| 2012/0241244 | A1 | 9/2012 | Escobedo et al. |
| 2013/0032430 | A1 | 2/2013 | Zaloga et al. |
| 2014/0157922 | A1 | 6/2014 | Schneider |
| 2014/0311263 | A1 | 10/2014 | Washnock et al. |
| 2015/0101436 | A1 | 4/2015 | Washnock et al. |
| 2018/0022381 | A1 | 1/2018 | Matsumura et al. |
| 2018/0086376 | A1 * | 3/2018 | Davis ................... B62D 5/0418 |
| 2018/0111643 | A1 | 4/2018 | Kim et al. |
| 2018/0244305 | A1 | 8/2018 | Cai et al. |
| 2019/0065173 | A1 | 2/2019 | Xi et al. |
| 2019/0351932 | A1 | 11/2019 | Washnock et al. |
| 2020/0017138 | A1 | 1/2020 | Kirchweger |
| 2020/0339183 | A1 | 10/2020 | Dehoff |
| 2021/0038766 | A1 | 2/2021 | Chen et al. |
| 2021/0261186 | A1 | 8/2021 | Hikida et al. |
| 2021/0261188 | A1 | 8/2021 | Ko et al. |
| 2021/0387666 | A1 | 12/2021 | Hultén |
| 2021/0403077 | A1 | 12/2021 | Kogan |
| 2022/0032991 | A1 | 2/2022 | Pattok et al. |
| 2022/0135118 | A1 | 5/2022 | Kadam et al. |
| 2022/0169305 | A1 | 6/2022 | Cartwright et al. |
| 2022/0204072 | A1 | 6/2022 | Boyle |
| 2022/0281516 | A1 | 9/2022 | Washnock |
| 2023/0271577 | A1 | 8/2023 | Birsching |
| 2024/0132144 | A1 * | 4/2024 | Wirth ................... B62D 5/0421 |
| 2025/0033691 | A1 * | 1/2025 | Noerenberg ......... B62D 5/0424 |
| 2025/0033692 | A1 * | 1/2025 | Noerenberg ......... B62D 5/0403 |

FOREIGN PATENT DOCUMENTS

| | | |
|---|---|---|
| CN | 107140010 B | 2/2019 |
| CN | 209225235 U | 8/2019 |

| | | | | |
|---|---|---|---|---|
| DE | 102024207047 | A1 * | 1/2025 | .......... B62D 5/0421 |
| EP | 2019021 | A1 | 1/2009 | |
| EP | 2450257 | A1 | 5/2012 | |
| JP | H062861 | B2 * | 1/1994 | |
| JP | 2004338553 | A | 12/2004 | |
| JP | 2008254624 | A | 10/2008 | |
| WO | WO-2019039183 | A1 * | 2/2019 | ........ B62D 15/0235 |
| WO | 2020089208 | A1 | 5/2020 | |
| WO | WO-2025062649 | A1 * | 3/2025 | ............... B62D 5/04 |

OTHER PUBLICATIONS

Description Translation for WO 2019039183 from Espacenet (Year: 2019).*

United States Patent and Trademark Office, "Non-Final Office Action," issued in connection with U.S. Appl. No. 17/087,557, dated Dec. 7, 2022, 10 Pages.

United States Patent and Trademark Office, "Final Office Action," issued in connection with U.S. Appl. No. 17/087,557, mailed on May 4, 2023, 13 pages.

United States and Patent and Trademark Office, "Non-Final Office Action," issued in connection with U.S. Appl. No. 17/192,703, mailed on Jul. 6, 2023, 9 pages.

United States Patent and Trademark Office, "Advisory Action," issued in connection with U.S. Appl. No. 17/087,557, mailed on Jul. 13, 2023, 3 Pages.

United States Patent and Trademark Office, "Advisory Action," issued in connection with U.S. Appl. No. 17/087,557, mailed on Aug. 15, 2023, 3 Pages.

United States and Patent and Trademark Office, "Notice of Allowance and Fee(s) Due," issued in connection with U.S. Appl. No. 17/192,703, mailed on Aug. 30, 2023, 7 pages.

United States Patent and Trademark Office, "Notice of Allowance and Fee(s) Due," issued in connection with U.S. Appl. No. 17/087,557, mailed on Sep. 13, 2023, 5 Pages.

United States Patent and Trademark Office, "Corrected Notice of Allowability," issued in U.S. Appl. No. 17/087,557, dated Oct. 19, 2023, 4 pages.

United States Patent and Trademark Office, "Supplemental Notice of Allowability," issued in connection with U.S. Appl. No. 17/192,703, mailed on Dec. 4, 2023, 2 Pages.

United States Patent and Trademark Office, "Notice of Allowance and Fee(s) Due," issued in connection with U.S. Appl. No. 18/340,647, on May 7, 2024, 9 pages.

United States Patent and Trademark Office, "Corrected Notice of Allowability," issued in connection with U.S. Appl. No. 18/340,647, on May 23, 2024, 2 pages.

United States Patent and Trademark Office, "Non-Final Action," issued in connection with U.S. Appl. No. 18/181,394, dated Oct. 1, 2025, 22 pages.

* cited by examiner

INTERMEDIATE GEAR SET(S)

ROTARY STEERING SYSTEMS

This patent arises from a continuation of U.S. patent application Ser. No. 18/340,647, which was filed on Jun. 23, 2023. U.S. patent application Ser. No. 18/340,647 is hereby incorporated herein by reference in its entirety. Priority to U.S. patent application Ser. No. 18/340,647 is hereby claimed.

FIELD OF THE DISCLOSURE

This disclosure relates generally to steering systems and, more particularly, to rotary steering systems.

BACKGROUND

Known vehicles typically include a mechanical linkage that connects front wheels of a vehicle to a steering wheel, which allows a driver to adjust the orientation of the front wheels by rotating the steering wheel. For example, many known steering systems include rack and pinion gears that translate rotational motion of a steering wheel to linear actuation or movement of a drag link and/or tie rods connected to the front wheels. As the steering wheel rotates, the drag link and/or the tie rods change the angular orientation of the wheels and steer the vehicle.

In recent years, trucks have utilized hydraulic assist recirculating ball (RCB) steering systems. The hydraulic assist of the RCB steering systems is provided by a pump that transports hydraulic steering fluid to the RCB system. In some implementations, electronic torque overlay mechanisms are utilized to provide an electric steering feel to the hydraulic system.

SUMMARY

Example rotary steering systems are disclosed herein. An example vehicle steering system includes an input gear fixed to an end of an input shaft. A first intermediate gear is fixed to a first pinion. The first intermediate gear is engaged with the input gear. A second intermediate gear is fixed to a second pinion. The second pinion is engaged with the first intermediate gear or a third intermediate gear. A motor is fixed to a third pinion. The third pinion is engaged with the second intermediate gear. The motor is to rotate the first intermediate gear and the first pinion. A third gear is fixed to a shaft. The third gear is engaged with the first pinion. The third gear and the shaft are to rotate as the first intermediate gear rotates. A pitman arm is coupled to the shaft. The pitman arm is to couple to a drag link to turn wheels of a vehicle as the shaft rotates.

An example vehicle steering system includes an input shaft including an input gear. A first gear assembly includes a first intermediate gear fixed to a first pinion. The first intermediate gear is engaged with the input gear. A second gear assembly includes a second intermediate gear fixed to a second pinion. The second pinion is engaged with the first intermediate gear or a third intermediate gear. A output shaft includes a third gear engaged with the first pinion. A motor is fixed to a third pinion. The third pinion is engaged with the second intermediate gear. The motor is to provide torque that rotates the input shaft, the first gear assembly, the second gear assembly, and the output shaft. A pitman arm is coupled to the output shaft. The pitman arm is to couple to a drag link to turn wheels of a vehicle as the output shaft rotates.

An example apparatus includes an input shaft including an input gear. A first gear set includes a first intermediate gear and a first pinion. The first intermediate gear is engaged with the input gear. A second gear set includes a second intermediate gear fixed to a second pinion. The second pinion is engaged with the first intermediate gear. An output shaft includes a sector gear and splines. The sector gear is positioned at a first end of the output shaft. The splines are positioned at a second end of the output shaft opposite the first end. The sector gear is engaged with the first pinion. A motor is fixed to a third pinion. The third pinion is engaged with the second intermediate gear. The motor is to provide torque that rotates the input shaft, the first gear set, the second gear set, and the output shaft.

BRIEF DESCRIPTION OF THE DRAWINGS

In general, the same reference numbers will be used throughout the drawing(s) and accompanying written description to refer to the same or like parts. The figures are not necessarily to scale.

Figure 1:
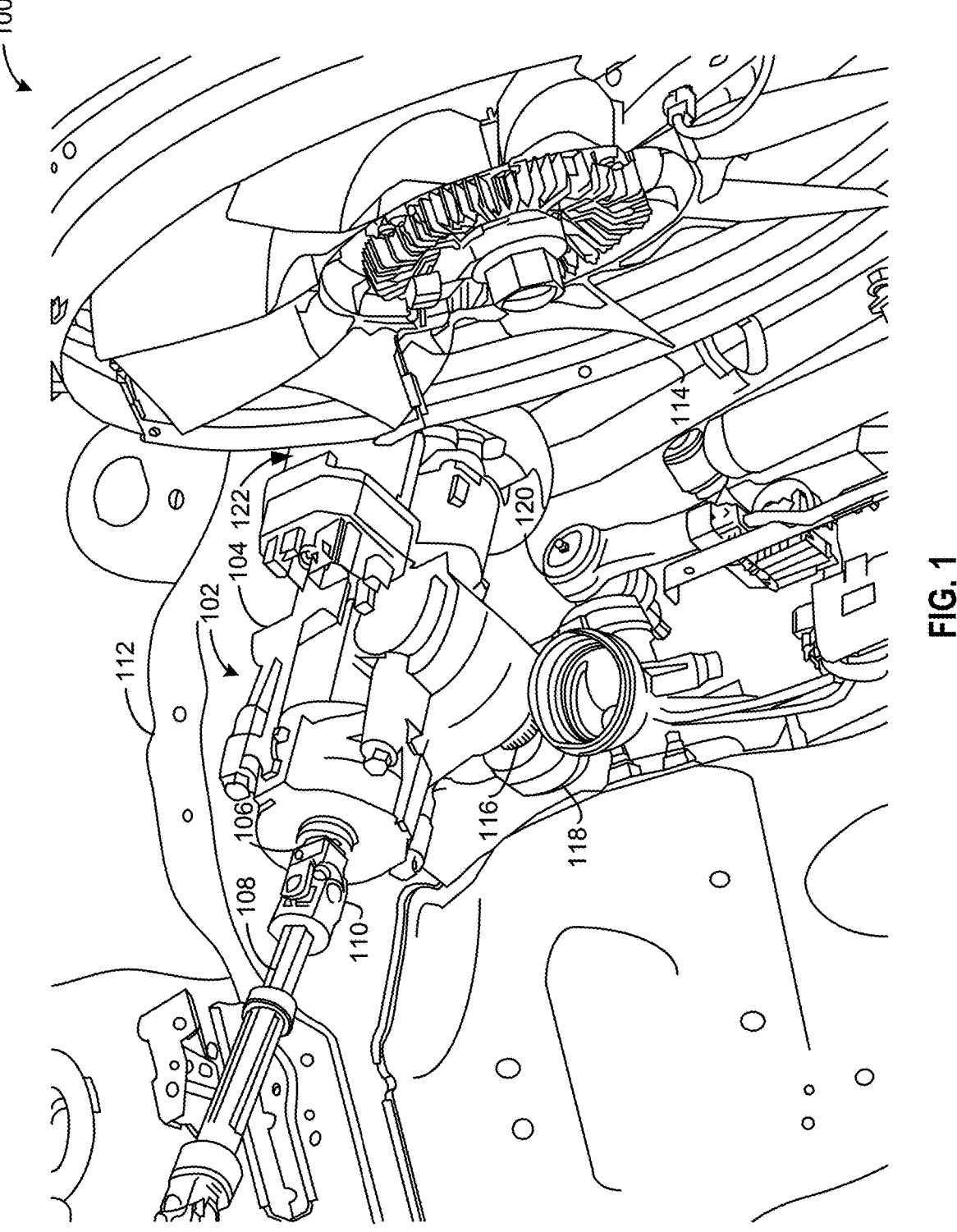
FIG. 1 illustrates a steering system in an under-hood environment of a vehicle.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein in the context of describing the position and/or orientation of a first object, plane, or axis relative to a second object, plane, or axis, the term "substantially perpendicular" encompasses the term perpendicular and more broadly encompasses a meaning whereby the first object, plane, or axis is positioned and/or oriented relative to the second object, plane, or axis at an absolute angle of no more than ten degrees (10°) from perpendicular. For example, a first axis that is substantially perpendicular to a second axis is positioned and/or oriented relative to the second axis at an absolute angle of no more than ten degrees (10°) from perpendicular.

As used herein in the context of describing the position and/or orientation of a first object, plane, or axis relative to a second object, plane, or axis, the term "substantially parallel" encompasses the term parallel and more broadly encompasses a meaning whereby the first object, plane, or axis is positioned and/or oriented relative to the second object, plane, or axis at an absolute angle of no more than ten degrees (10°) from parallel. For example, a first axis that is substantially parallel to a second axis is positioned and/or oriented relative to the second axis at an absolute angle of no more than ten degrees (10°) from parallel. Accordingly, as used herein, the term "non-parallel" encompasses the first object, plane, or axis not being within ten degrees (10°) of parallel to the second object, plane, or axis.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s))) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

Disclosed herein are example rotary steering systems. Traditionally, some heavy-duty trucks have utilized a steering mechanism including hydraulically assisted RCB gears or worm and wheel steering gears. In some instances, a pump provides the hydraulic assist to the RCB gears by pumping hydraulic steering fluid through the steering system. In some such instances, as the steering wheel is turned, a steering shaft rotates to cause a ball nut of the RCB gears to move linearly. In turn, the ball nut rotates a sector that is coupled to a pitman arm that turns the wheels. The hydraulic steering fluid is pumped to assist the movement of the ball nut based on the rotation of the steering shaft. Alternatively, an electrically powered motor can be utilized instead of the hydraulic pump to move the ball nut. However, space in an under-hood environment of the vehicle must remain clear of other vehicle systems and reserved for the linear movement of the ball nut in RCB steering gears.

Examples disclosed herein provide completely rotary steering gear systems that generate sufficient power to steer relatively heavy vehicles, such as trucks. As such, the steering systems enable such relatively heavy vehicles to utilize electrically powered steering systems instead of hydraulically powered steering systems. Moreover, a lack of linear movement in the rotary steering gear systems enables the systems to occupy less space in an under-hood environment of the vehicle and, thus, leaves more space in the under-hood environment for other systems associated with the vehicle, such as an engine, a fan, etc. Additionally, the rotary steering gear system can be implemented in a variety of vehicles with different under-hood layouts. Non-limiting examples of vehicles disclosed herein include internal combustion engine vehicles, battery electric vehicles, hybrid electric vehicles, fuel-cell vehicles, etc. Although the completely rotary steering gear systems disclosed herein generate enough power to steer trucks, it should be understood that examples disclosed herein may be implemented in any other steerable vehicle.

FIG. 1 illustrates a first view of a vehicle steering system (e.g., a steering apparatus, a steering actuator) 102 in an under-hood environment 100 of a vehicle. In FIG. 1, the steering system 102 is positioned within a housing 104. In some examples, the housing 104 includes one or more housings that are coupled to protect the steering system 102. In some examples, an input shaft 106 of the steering system 102 protrudes from the housing 104. In some examples, the input shaft 106 couples to a steering shaft 108 via a connection 110. In some examples, the steering shaft 108 is operatively coupled to a steering wheel of the vehicle. As a result, the input shaft 106 rotates with the steering shaft 108 as a driver rotates the steering wheel. In turn, the steering system 102 converts the rotation of the steering wheel to a rotation of the wheels of the vehicle to steer the vehicle. Additionally or alternatively, the steering system 102 can cause the wheels of the vehicle to rotate without the rotation of the steering wheel when the vehicle is autonomously driven.

In FIG. 1, the steering system 102 is positioned in the under-hood environment 100 between a frame 112 and a fan 114 of the vehicle. Typically, vehicles include the fan 114 to pass air through a radiator and maintain an operating temperature of an engine of the vehicle. Accordingly, the fan 114, the radiator, and the engine take up a significant amount of the space in the under-hood environment 100. The engine of the vehicle is not shown in FIG. 1 to more clearly illustrate an output shaft 116, a pitman arm 118, and a drag link 120 of the steering system 102. Advantageously, stacked gears and a position of a motor 122 of the steering system 102 enables the steering system 102 to be positioned within relatively small spaces in the under-hood environment 100 while still generating enough power to turn the wheels of heavy trucks. Specifically, the stacked gears provide a combined reduction of greater than 100:1 to generate ample force to turn the wheels.

The output shaft 116 extends from a sector gear within the housing 104. More particularly, the output shaft 116 protrudes from a bottom portion of the housing 104 to couple to the pitman arm 118. In some examples, an opening of the pitman arm 118 includes splines that mate with splines 124 of the output shaft 116. Further, the pitman arm 118 is coupled to the drag link 120, which is connected to a wheel of the vehicle.

In FIG. 1, the steering system 102 causes the output shaft 116 to rotate in response to a rotation of the steering shaft 108 and/or an autonomous steering command. In turn, the output shaft 116 moves (e.g., pivots) the pitman arm 118. Further, the pitman arm 118 converts the rotation of the output shaft 116 into a linear movement of the drag link 120. In some examples, the drag link 120 is connected to a knuckle of a wheel of the vehicle. In some such examples, the linear movement of the drag link 120 adjusts an orientation of the knuckle to turn the wheels. As a result, the steering system 102 converts the rotation of the steering shaft 108 into a movement of the wheels to steer the vehicle.

In some examples, an ample amount of force must be generated to turn the wheels of heavier vehicles, such as trucks. As such, the steering system 102 provides a combined gear reduction of greater than 100:1 to generate the ample amount of force required to steer trucks while utilizing electrically powered steering.

Figure 2A:
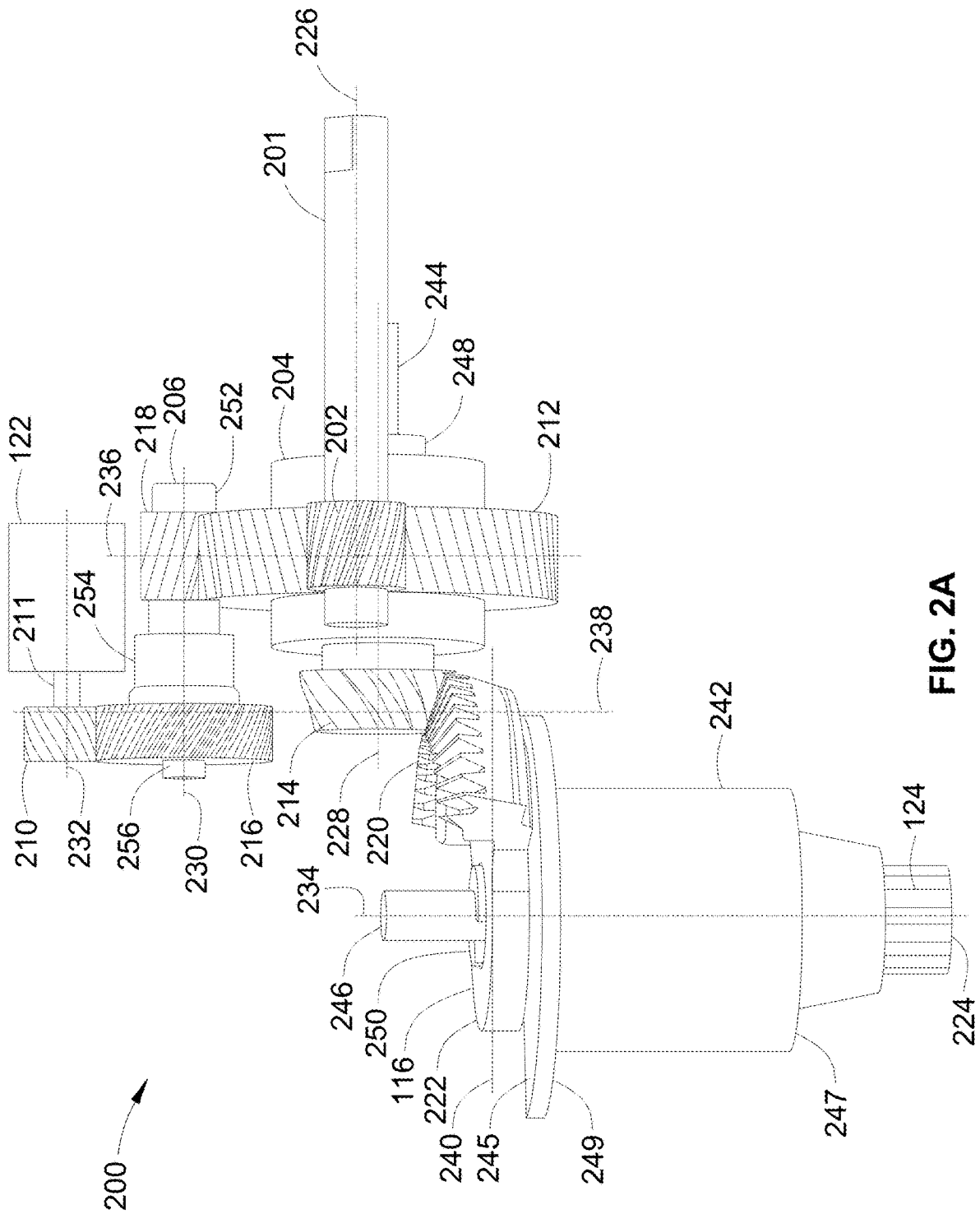
FIG. 2A illustrates a view of an example implementation of a portion of the steering system of FIG. 1.

FIG. 2A illustrates a portion of a first example steering system 200 (e.g., a first example implementation of the steering system 102 of FIG. 1). In FIG. 2A, the steering system 102 includes an input shaft 201 (e.g., a first example implementation of the input shaft 106 of FIG. 1) and an input gear 202 fixed to the input shaft 201. The steering system 200 also includes a first gear assembly 204 (e.g., a first torque multiplication assembly, a first gear set), a second gear assembly 206 (e.g., a second torque multiplication assembly, a second gear set), the output shaft 116, the motor 122 of FIG. 1, and a first pinion 210 fixed to a shaft 211 of the motor 122. The first gear assembly 204 includes a first intermediate gear 212 and a second pinion 214. The second gear assembly 206 includes a second intermediate gear 216 and a third pinion 218.

In the illustrated example of FIG. 2A, the output shaft 116 includes a sector gear 220 fixed to a first longitudinal end 222 of the output shaft 116. The output shaft 116 also includes the splines 124 positioned at a second longitudinal end 224 of the output shaft 116. The first longitudinal end 222 of the output shaft 116 faces a first direction (e.g., upwards) and the second longitudinal end 224 of the output shaft 116 faces a second direction (e.g., downwards) opposite the first direction. The sector gear 220 at least partially faces the first direction (e.g., a same direction as the first longitudinal end 222, upwards in the orientation of FIG. 2A).

In the illustrated example of FIG. 2A, the input gear 202 and the third pinion 218 are engaged with the first intermediate gear 212. The first pinion 210 is engaged with the second intermediate gear 216. The second pinion 214 is engaged with the sector gear 220. The motor 122 provides assistive steering torque when the input shaft 201 rotates and/or provides an entirety of the steering torque when the associated vehicle drives autonomously. Specifically, the motor 122 rotates the first pinion 210, which rotates the second intermediate gear 216 and, in turn, the third pinion 218. Further, the third pinion 218 and/or the input gear 202 rotate the first intermediate gear 212 and, in turn, the second pinion 214. Further, the second pinion 214 rotates the sector gear 220. The splines 124 rotate with the sector gear 220 and pivot the pitman arm 118 of FIG. 1, which moves the drag link 120 of FIG. 1 and causes the wheels of the vehicle to pivot.

In the illustrated example of FIG. 2A, the first gear assembly 204 and the second gear assembly 206 increase the torque generated by the motor 122 to generate a sufficient force to rotate the sector gear 220 when the steering system 200 is implemented in a heavier vehicle. Specifically, as the first pinion 210 has a smaller circumference and fewer teeth (e.g., cogs) than the second intermediate gear 216, the engagement between the first pinion 210 and the second intermediate gear 216 provides a first gear reduction. Similarly, the engagement between the third pinion 218 and the first intermediate gear 212 provides a second gear reduction, and the engagement between the second pinion 214 and the sector gear 220 can provide a third gear reduction. Together, the gear reductions can provide a reduction ratio of greater than 100:1 to increase the torque that the sector gear 220 encounters from the second pinion 214.

In the illustrated example of FIG. 2A, the input shaft 201 and the input gear 202 are aligned along a first rotational axis 226. The first intermediate gear 212 and the second pinion 214 are aligned along a second rotational axis 228. The second intermediate gear 216 and the third pinion 218 are aligned along a third rotational axis 230. The first pinion 210 and the shaft 211 of the motor 122 are aligned along a fourth rotational axis 232. In the illustrated example of FIG. 2A, the first rotational axis 226, the second rotational axis 228, the third rotational axis 230, and the fourth rotational axis 232 are substantially parallel. In some examples, at least two of the first, second, third, and/or fourth axes of rotation 226, 228, 230, 232 are non-parallel. For example, the third rotational axis 230 can be non-parallel to the second rotational axis 228 so long as the third pinion 218 is operatively engaged with the first intermediate gear 212.

In the illustrated example of FIG. 2A, the output shaft 116 (e.g., the sector gear 220 and the splines 124) is aligned along a fifth rotational axis 234. In some examples, the fifth rotational axis 234 is substantially perpendicular to the first rotational axis 226, the second rotational axis 228, the third rotational axis 230, and the fourth rotational axis 232. More particularly, the second pinion 214 and the sector gear 220 are bevel gears and the fifth rotational axis 234 intersects the second rotational axis 228. Accordingly, the engagement between the second pinion 214 and the sector gear 220 converts the rotations within the system 200 from rotations along axes that transverse the output shaft 116 to a rotation along a longitudinal axis (e.g., the fifth rotational axis 234) of the output shaft 116. As such, the conversion of the rotational direction provided by the engagement between the second pinion 214 and the sector gear 220 enables the steering system 200 to operate without any linear movement. Advantageously, the absence of linear movement during operation enables the steering system 200 to occupy less space and, thus, fit within a variety of under-hood environments while leaving additional room for other systems associated with the vehicle.

In the illustrated example of FIG. 2A, the input gear 202 and the third pinion 218 are engaged with the first intermediate gear 212 in a first geometric plane 236. The first pinion 210 is engaged with the second intermediate gear 216 in a second geometric plane 238. Further, the second pinion 214 and a portion of the sector gear 220 engaged with the second pinion 214 are aligned in the second geometric plane 238. In the illustrated example of FIG. 2A, the first and second geometric planes 236, 238 are substantially parallel. Moreover, the sector gear 220 rotates within a third geometric plane 240 that is substantially perpendicular to the first and second geometric planes 236, 238.

In some examples, the second pinion 214 and the portion of the sector gear 220 are aligned in another geometric plane (e.g., a fourth geometric plane substantially parallel to the first and second geometric planes) positioned between the first geometric plane 236 and the second geometric plane 238. In some examples, to fit within certain under-hood environments, the first pinion 210 and the second intermediate gear 216 are positioned on the side of the first intermediate gear 212 opposite the second pinion 214. In such examples, the first pinion 210 is engaged with the second intermediate gear 216 on a first side of the first geometric plane 236 and the second pinion 214 is engaged with the sector gear 220 on a second side of the first geometric plane 236 opposite the first side. Additionally, a placement of the first rotational axis 226 is orbital relative to relative to the second rotational axis 228; a placement of the third rotational axis 230 is orbital relative to the second rotational axis 228; and a placement of the fourth rotational axis 232 is orbital relative to the third rotational axis 230. Thus, in addition to occupying a relatively small amount of space, the layout of the steering is adaptable based on the particular under-hood environment in which the steering system 200 is to be implemented.

In the illustrated example of FIG. 2A, the steering system 200 includes a cover 242 (e.g., a sub-housing) positioned around the output shaft 116 between the sector gear 220 and the splines 124. Specifically, the cover 242 includes a first end 245 proximate the sector gear 220 and a second end 247 proximate the splines 124. In some examples, the cover 242 is coupled to the housing 104 of FIG. 1. In some examples, the cover 242 includes a rim 249 (e.g., a projecting edge) that projects away from the fifth rotational axis 234 at the first end 245. In such examples, the rim 249 is positioned underneath the sector gear 220. In some examples, the rim 249 extends entirely around the first end 245 of the cover 242. In some other examples, the rim 249 extends around a portion of the first end 245 of the cover 242 that corresponds with a range of movement of the sector gear 220. In some examples, the sector gear 220 slides on the rim 249 as the second pinion rotates the sector gear 220. In such examples, the rim 249 provides axial support to the sector gear 220.

To enable the first gear assembly 204 and the output shaft 116 to be supported, the steering system 200 includes a first axial position screw 244 (e.g., a first positioning screw, a first mesh screw, a first axial position adjuster screw etc.) and a second axial position screw 246 (e.g., a second positioning screw, a second mesh screw, a second axial adjuster screw, etc.). The first axial position screw 244 is positioned along the second rotational axis 228, and the second axial position screw 246 is positioned along the fifth rotational axis 234. The steering system 200 also includes a first lock ring 248 (e.g., a first threaded lock ring) and a second lock ring 250 (e.g., a second threaded lock ring) to couple the first axial position screw 244 and the second axial position screw 246 to the first gear assembly 204 and the output shaft 116, respectively.

As discussed in further detail below, during assembly of the steering system 200, the first axial position screw 244 and the second axial position screw 246 move the first gear assembly 204 and the output shaft 116, respectively, until the engagement between the second pinion 214 and the sector gear 220 provides a certain torque (e.g., 1 Newton-meter (Nm)) when the second pinion 214 rotates thereby forming a precise mesh between the second pinion 214 and the sector gear 220. In some examples, when the respective positions of the first gear assembly 204 and the output shaft 116 are set, the first axial position screw 244 and/or the second axial position screw 246 are coupled to the housing 104 or a sub-housing. For example, the first axial position screw 244 and/or the second axial position screw 246 can be staked to the housing 104 or the sub-housing. In some examples, the first axial position screw 244 and/or the second axial position screw 246 can be secured with a lock nut. As a result, the first axial position screw 244 and the second axial position screw 246 support the first gear assembly 204 and the output shaft 116 within the housing 104.

To enable the second gear assembly 206 to be supported, the second gear assembly 206 includes a first bearing journal 252, a second bearing journal 254, and a third bearing journal 256. The first bearing journal 252 is positioned on a side of the third pinion 218 opposite the second intermediate gear 216. Additionally or alternatively, the first bearing journal 252 can be positioned within a circumference of the third pinion 218. The second bearing journal 254 is positioned between the third pinion 218 and the second intermediate gear 216. Further, the third bearing journal 256 is positioned on a side of the second intermediate gear 216 opposite the third pinion 218. Additionally or alternatively, the third bearing journal 256 can be positioned within a circumference of the second intermediate gear 216. The bearing journals 252, 254, 256 can be positioned in respective sleeves or shells that are coupled to the housing 104 or another sub-housing for support while enabling the second gear assembly 206 to rotate.

Figure 2B:
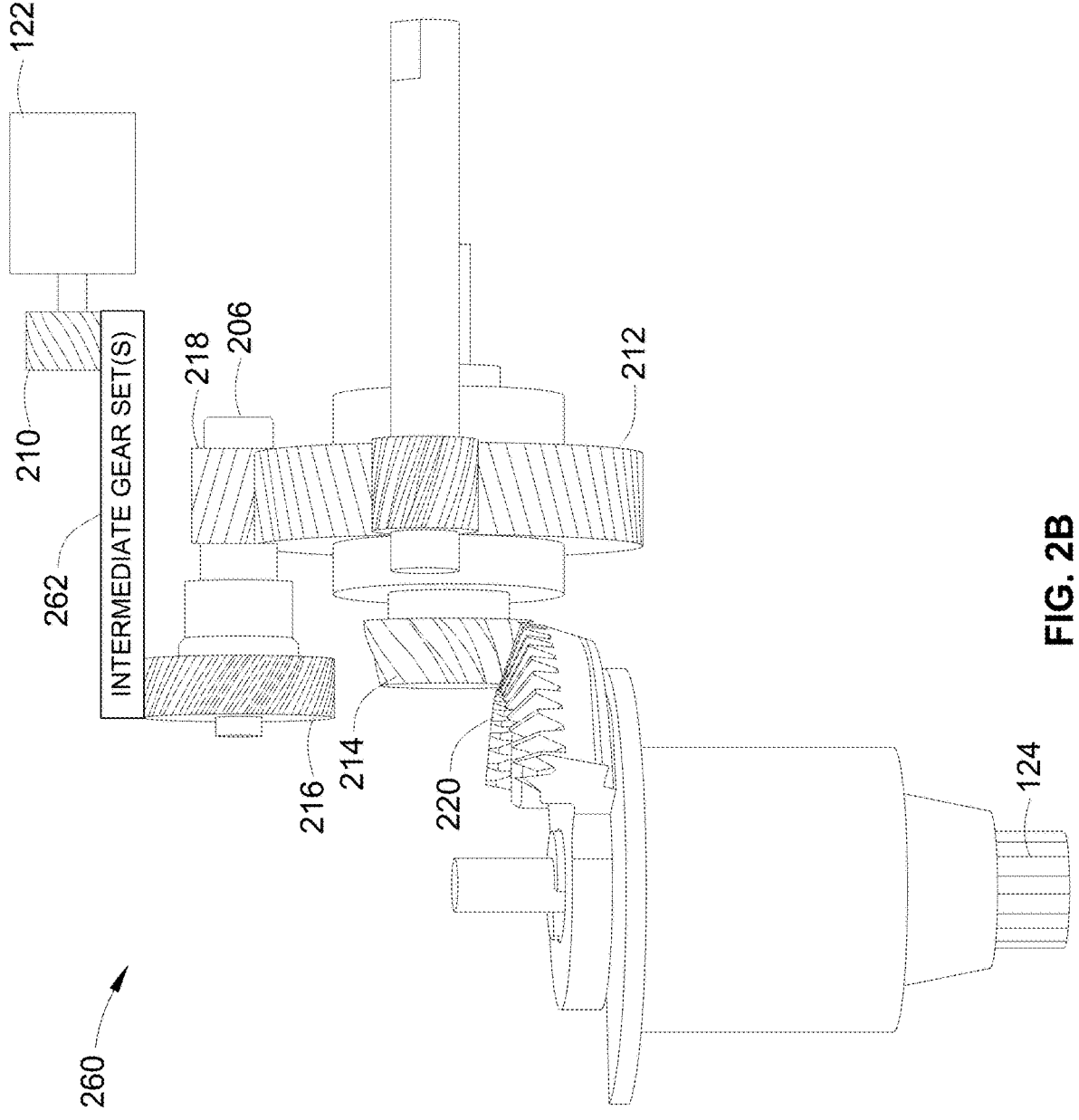
FIG. 2B illustrates a view of another example implementation of the portion of the steering system of FIG. 1.

FIG. 2B illustrates another example steering system 260 that includes one or more additional intermediate gear set(s) 262 in addition to the components of the steering system 200 of FIG. 2A. In the illustrated example of FIG. 2B, the additional intermediate gear set(s) 262 include(s) one or more intermediate gear(s) each of which are fixed to a respective pinion (e.g., similar to the second intermediate gear 216 and the third pinion 218 of the second gear assembly 206). As such, the intermediate gear set(s) 262 include an intermediate gear engaged with the first pinion 210 at one end and a pinion engaged with the second intermediate gear 216 at the other end to increase the gear reduction ratio and, thus, the torque delivered to the sector gear 220.

In the illustrated example of FIG. 2B, during operation, the motor 122 rotates the first pinion 210, which rotates the intermediate gear of the intermediate gear set(s) 262 that is engaged with the first pinion 210. Accordingly, a pinion of the intermediate gear set(s) 262 that is fixed to the intermediate gear of the intermediate gear set(s) 262 rotates therewith. In some examples, the pinion is engaged with and rotates the second intermediate gear 216 and, in turn, the third pinion 218. As a result, the first intermediate gear 212, the second pinion 214, the sector gear 220, and the splines 124 rotate. In some examples, the pinion of the intermediate gear set(s) 262 rotates another intermediate gear of the intermediate gear set(s) 262 and, in turn, another pinion fixed thereto. In turn, the pinion can be engaged with and rotate the second intermediate gear 216 or another intermediate gear set. The quantity of intermediate gears and associated pinions that the additional intermediate gear set(s) 262 includes between the first pinion 210 and the second intermediate gear 216 depends on the vehicle in which the steering system 260 is to be implemented and/or the space available for the steering system 260 in the under-hood environment of the vehicle.

Figure 3:
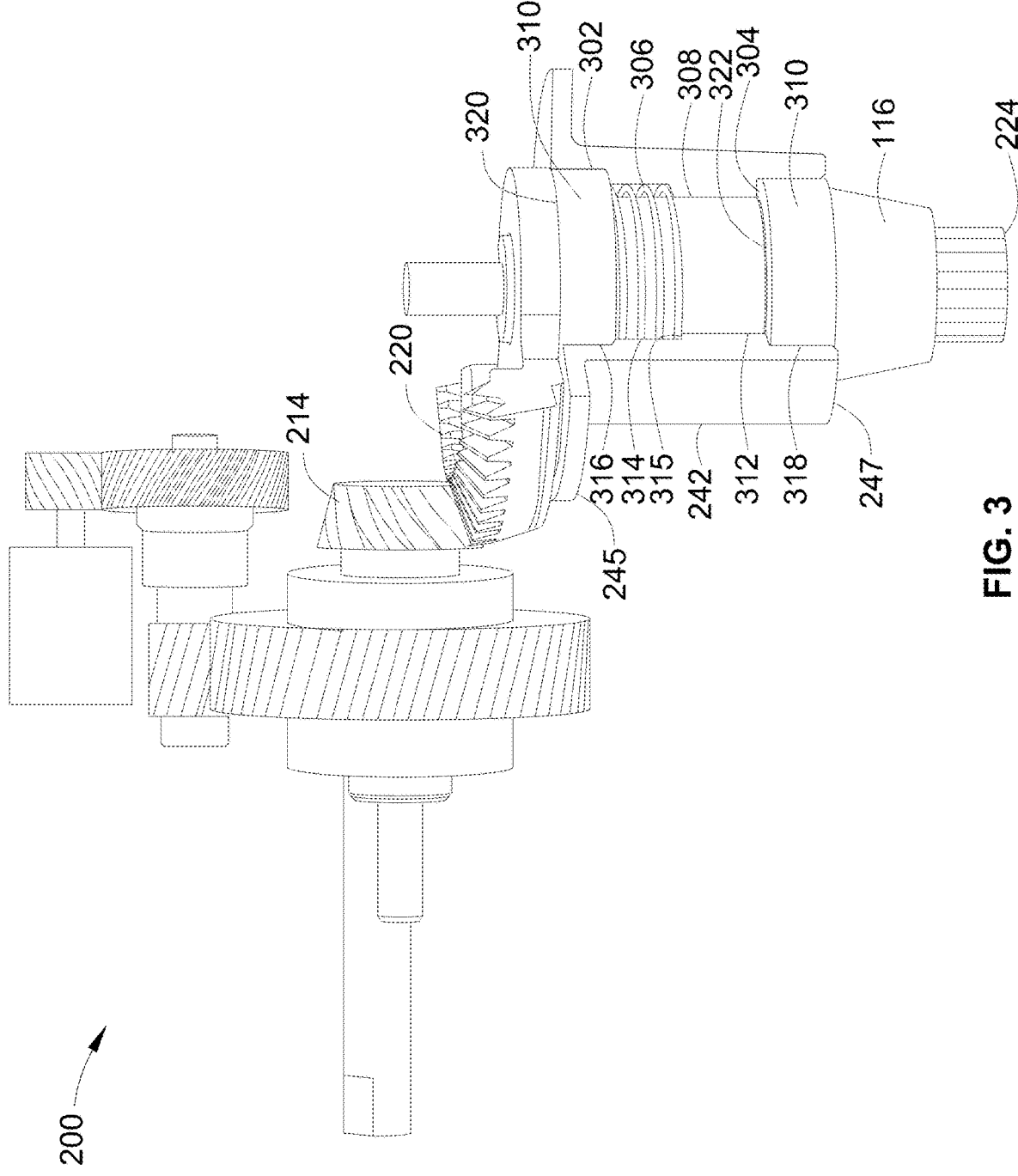
FIG. 3 illustrates another view of the portion of the first example steering system of FIGS. 1, 2A, and 2B.

FIG. 3 illustrates another view of the example steering systems 200, 260 of FIGS. 2A-2B with a portion of the cover 242 removed. In the illustrated example of FIG. 3, the steering system 200 includes a first roller bearing 302 (e.g., a first needle bearing), a second roller bearing 304 (e.g., a second needle bearing), and a spring 306 positioned around the output shaft 116 between the cover 242 and the output shaft 116. Specifically, the first roller bearing 302 is positioned at the first end 245 of the cover 242; the second roller bearing 304 is positioned at the second end 247 of the cover 242; and the spring 306 is positioned around a portion of the output shaft 116 between the first roller bearing 302 and the second roller bearing 304.

In the illustrated example of FIG. 3, the first roller bearing 302 and the second roller bearing 304 include inner radial surfaces (not shown) that are coupled to an outer radial surface 308 of the output shaft 116. The first roller bearing 302 and the second roller bearing 304 also include outer radial surfaces 310 that are coupled to an inner radial surface 312 of the cover 242. The first roller bearing 302 and the second roller bearing 304 also include roller bearings (e.g., rolling elements) (not shown) positioned between the inner and outer radial surfaces 310 of the roller bearings 302, 304. During operation, as the second pinion 214 rotates the sector gear 220, the roller bearings roll between the inner radial surfaces and the outer radial surfaces 310 to radially support to the output shaft 116. Thus, the second axial position screw

246 and/or the cover 242 can axially support the output shaft 116 and the roller bearings 302, 304 can radially support the output shaft 116.

In the illustrated example of FIG. 3, during assembly of the steering system 200, the spring 306 provides a constant force on the output shaft 116 in a direction toward the sector gear 220 (e.g., upwards). Specifically, the inner radial surface 312 of the cover 242 includes a first indentation 314, and a first end of the spring 306 (e.g., an end opposite the sector gear 220) can be positioned on a surface 315 (e.g., a shoulder) of the first indentation 314 that faces the first end 245. Furthermore, the outer radial surface 308 of the output shaft 116 includes a protrusion (not shown) (e.g., a second shoulder) against which a second end of the spring 306 exerts the upward force. For example, the protrusion against which the second of the spring 306 is positioned can be defined at or downward of an end of the first roller bearing 302 that faces the second longitudinal end 224 of the output shaft 116. Furthermore, a surface of the protrusion that the spring 306 contacts faces the second longitudinal end 224. As a result, the spring 306 pushes the sector gear 220 against the second pinion 214 to help move the output shaft 116 into a position that results in a desired torque between the second pinion 214 and the sector gear 220 during assembly. In some examples, the spring 306 is removed when the second axial position screw 246 and/or the cover 242 are coupled to the housing 104 of FIG. 1. In some examples, an actuator and associated programmable circuitry are utilized instead of the spring 306 to provide the upward force during assembly. For example, the programmable circuitry can cause the actuator to move the output shaft 116 toward the second pinion 214 and stop the movement of the output shaft 116 when the programmable circuitry determines that the actuator is encountering a resistance indicative of sufficient contact between the second pinion 214 and the sector gear 220.

In some examples, the inner radial surface 312 of the cover 242 includes a second indentation 316 for the first roller bearing 302 and a third indentation 318 for the second roller bearing 304. Additionally, the outer radial surface 308 of the output shaft 116 can include a second protrusion 320 against which an end of the first roller bearing 302 is positioned. Similarly, the outer radial surface 308 of the output shaft 116 can include a third protrusion 322 at the first longitudinal end 222 that the second roller bearing 304 contacts. Accordingly, the indentations 316, 318 in the cover 242 and the protrusions 320, 322 of the output shaft 116 serve as position markers for the roller bearings 302, 304 to improve an accuracy of the positions of the roller bearings 302, 304 and/or an efficiency with which the roller bearings 302, 304 are positioned during assembly of the steering system 200.

Figure 4:
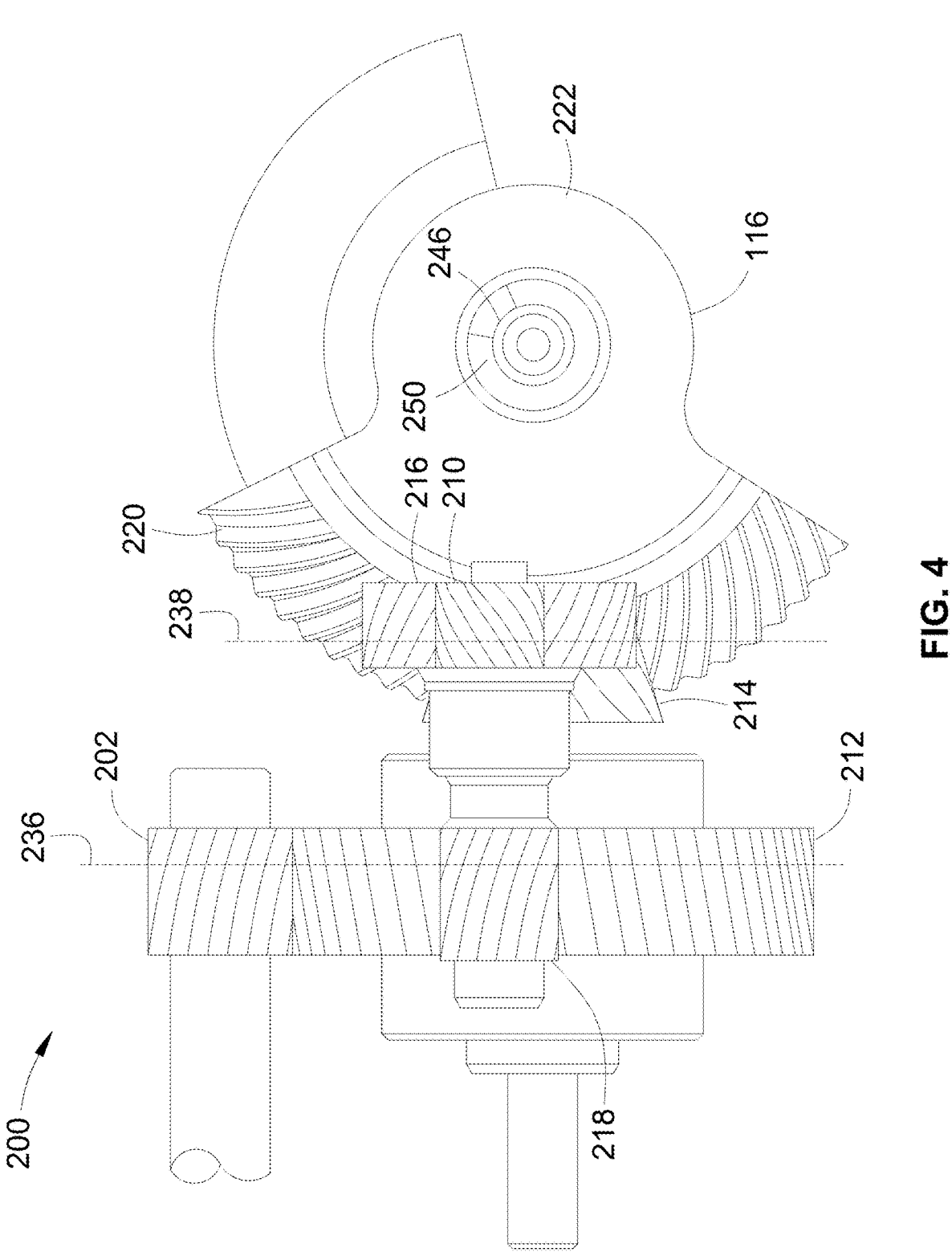
FIG. 4 illustrates another view of a portion of the first example steering system of FIGS. 1, 2A, 2B, and 3.

FIG. 4 illustrates another view of the first example steering system 200 of FIGS. 2 and 3. In the illustrated example of FIG. 4, the input gear 202 and the third pinion 218 are engaged with the first intermediate gear 212 within the first geometric plane 236. The first pinion 210 is engaged with the second intermediate gear 216 within the second geometric plane 238. Additionally, the second pinion 214 is engaged with the sector gear 220 within the second geometric plane 238. In the illustrated example of FIG. 4, the second axial position screw 246 and the second lock ring 250 extend from the first longitudinal end 222 of the output shaft 116.

Figure 5:
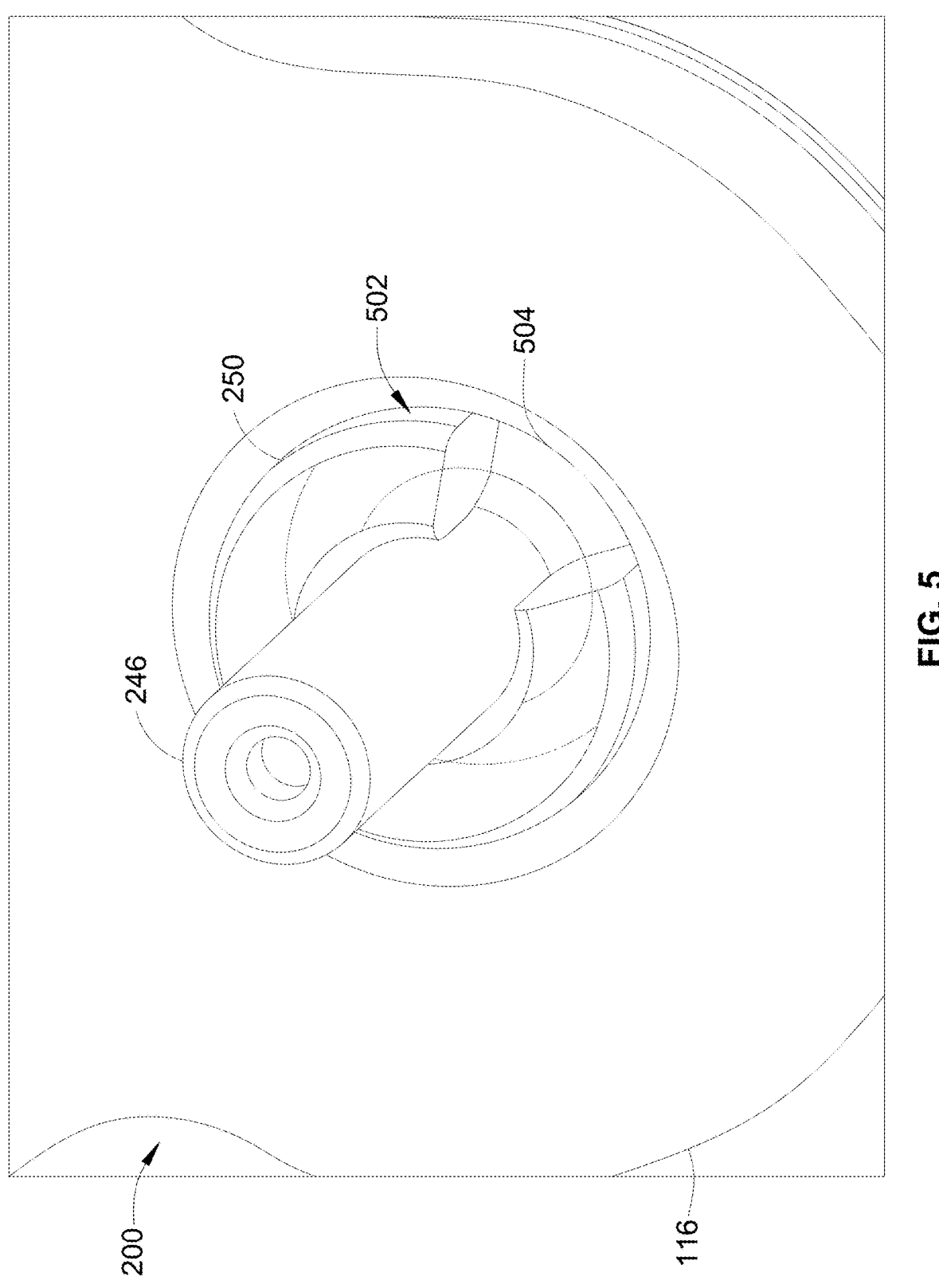
FIG. 5 illustrates another view of a portion of the first example steering system of FIGS. 1, 2A, 2B, 3, and 4.

FIG. 5 illustrates a magnified view of the second axial position screw 246 and the second lock ring 250 that position the output shaft 116 of the steering system 200 during assembly. As shown in the illustrated in the illustrated example of FIG. 5, the second axial position screw 246 extends at least partially through a pocket 502 in the output shaft 116. More particularly, the pocket 502 extends along the fifth rotational axis 234 at least partially through the output shaft 116. The second lock ring 250 holds the second axial position screw 246 in the pocket 502. For example, the second lock ring 250 can be a jam nut that locks the second axial position screw 246 in the pocket 502 of the output shaft 116. As such, the second lock ring 250 enables the output shaft 116 to be axially movable with the second axial position screw 246. In some examples, the steering system 200 includes a washer 504 positioned in the pocket 502 and in contact with the second lock ring 250. In such examples, the washer 504 eases rotational movement of the second axial position screw 246 and/or the second lock ring 250.

Figure 6:
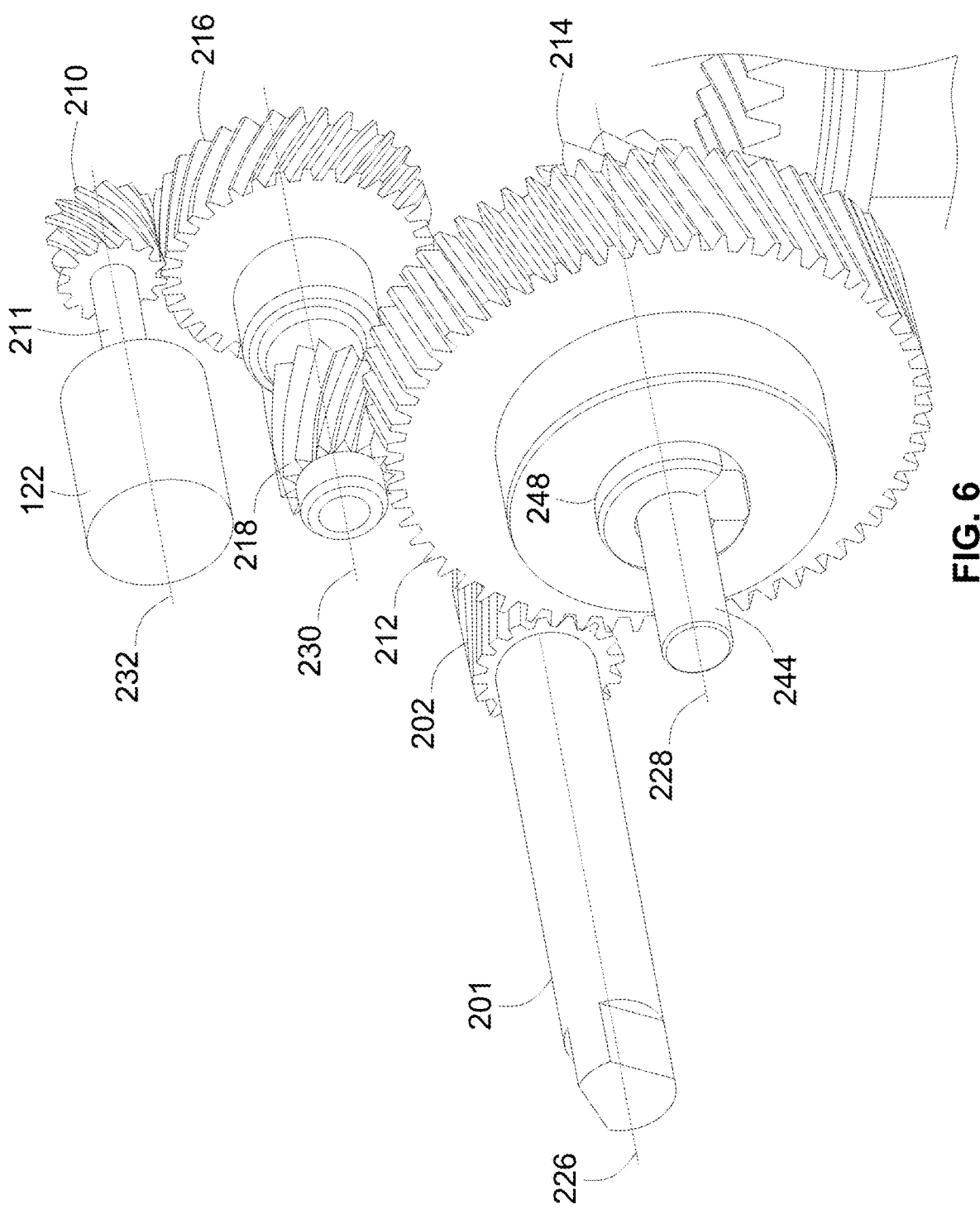
FIG. 6 illustrates another view of a portion of the first example steering system of FIGS. 1, 2A, 2B, 3, 4, and 5.

FIG. 6 illustrates another view of the first example steering system 200 of FIGS. 2-5. In the illustrated example of FIG. 6, the input shaft 201 and the input gear 202 are aligned along the first rotational axis 226. The first intermediate gear 212 and the second pinion 214 are aligned along the second rotational axis 228. The second intermediate gear 216 and the third pinion 218 are aligned along the third rotational axis 230. The first pinion 210 and the shaft 211 of the motor 122 are aligned along the fourth rotational axis 232. In the illustrated example of FIG. 6, the first axial position screw 244 and the first lock ring 248 extend from a side of the first gear assembly 204 on an opposite side of the first intermediate gear 212 from the second pinion 214.

Figure 7:
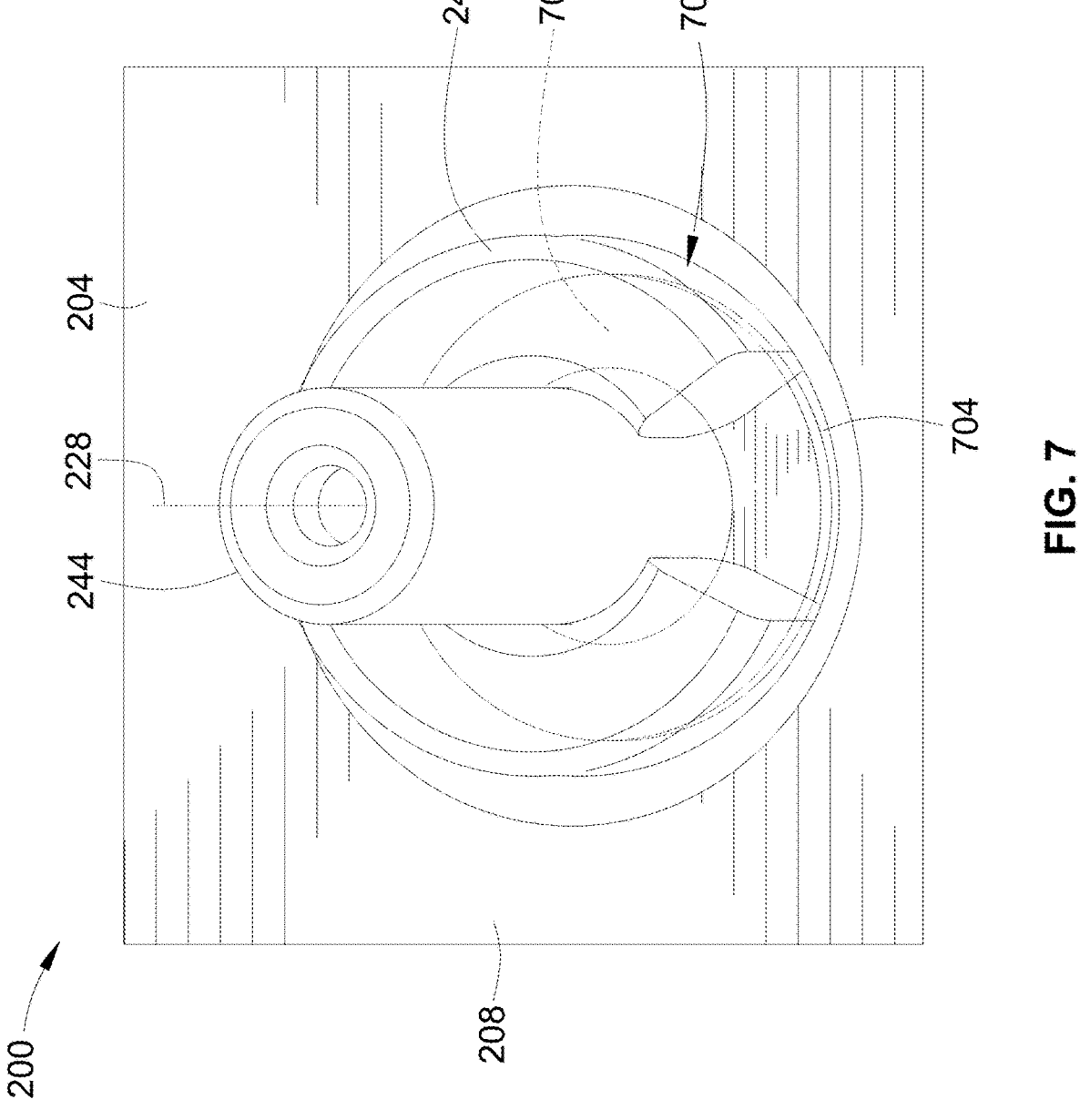
FIG. 7 illustrates another view of a portion of the first example steering system of FIGS. 1, 2A, 2B, 3, 4, 5, and 6.

FIG. 7 illustrates a magnified view of the first axial position screw 244 and the first lock ring 248 that position the first gear assembly 204 of the steering system 200 during assembly and/or support the first gear assembly 204 during operation. As shown in the illustrated example of FIG. 7, the first axial position screw 244 extends at least partially through a pocket 702 in the first gear assembly 204. More particularly, the pocket 702 extends along the second rotational axis 228 at least partially through the first gear assembly 204. The first lock ring 248 holds the first axial position screw 244 in the pocket 702. For example, the first lock ring 248 can be a jam nut that locks the first axial position screw 244 in the pocket 702 of the first gear assembly 204. As such, the first lock ring 248 enables the first gear assembly 204 to be axially movable with the first axial position screw 244. In some examples, the steering system 200 includes washers 704, 706 positioned in the pocket 702. For example, a first washer 704 can be in contact with the first lock ring 248, and a second washer 706 can be in contact with an internal surface of the first gear assembly 204. In such examples, the washers 704, 706 ease rotational movement of the first axial position screw 244 and/or the first lock ring 248.

Figure 8A:
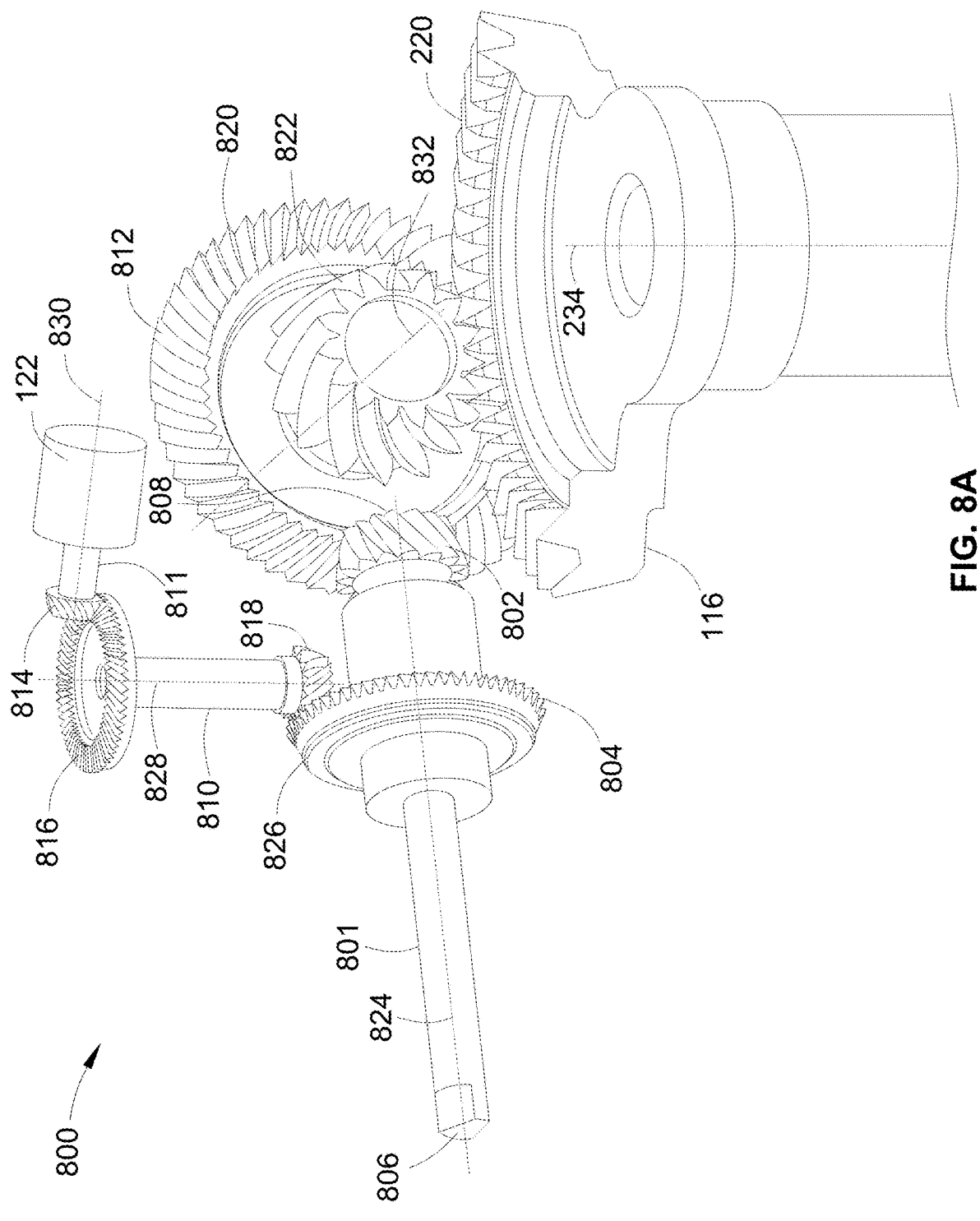
FIG. 8A illustrates a view of another example implementation of the portion of the steering system of FIG. 1.

FIG. 8A illustrates a portion of a second example steering system 800 (e.g., a second example implementation of the steering system 102 of FIG. 1). In the illustrated example of FIG. 8A, the steering system 800 includes an input shaft 801 (e.g., a second example implementation of the input shaft 106 of FIG. 1). The steering system 800 also includes an input gear 802 and a first intermediate gear 804 fixed to the input shaft 801. Specifically, the input shaft 801 includes a first end 806 (e.g., an end that couples to the steering shaft 108 of FIG. 1) and a second end 808 opposite the first end. The input gear 802 is fixed to the second end 808.

In the illustrated example of FIG. 8A, the steering system 800 also includes a first gear assembly 810 (e.g., a first gear set), a second gear assembly 812 (e.g., a second gear set), the output shaft 116, the motor 122, a motor shaft 811, and a first pinion 814 fixed to an end of the motor shaft 811. The first gear assembly 810 includes a second intermediate gear 816 and a second pinion 818. The second gear assembly 812 includes a third intermediate gear 820 and a third pinion 822. The first pinion 814 is engaged with the second intermediate gear 816, which provides a first gear reduction. The second pinion 818 is engaged with the first intermediate gear 804, which provides a second gear reduction. The input gear 802 is engaged with the third intermediate gear 820, which provides a third gear reduction. The third pinion 822 is engaged with the sector gear 220, which provides a fourth gear reduction.

During operation, the motor 122 rotates the first pinion 814, which rotates the second intermediate gear 816 and, in turn, the second pinion 818. The second pinion 818 rotates the first intermediate gear 804 and, thus, transfers the torque that the motor 122 generates to the input shaft 801. The transferred torque enables the input gear 802 to rotate the third intermediate gear 820 and, in turn, the third pinion 822. As such, the third pinion 822 rotates the sector gear 220 and the splines 124 of FIGS. 1-3 rotate with the sector gear 220 and pivot the pitman arm 118 of FIG. 1, which moves the drag link 120 of FIG. 1 and causes the wheels of the vehicle to pivot.

In the illustrated example of FIG. 8A, the input shaft 801 is aligned along a first rotational axis 824 (e.g., the first rotational axis 226 of FIG. 2A). As such, the input gear 802 and the first intermediate gear 804 rotate about the first rotational axis 824. In FIG. 8A, the first intermediate gear 804 is positioned on a protrusion 826 in the input shaft 801 that extends radially outward between the first end 806 and the second end 808. As such, the first intermediate gear 804 includes a greater circumference than the input gear 802.

In the illustrated example of FIG. 8A, the first gear assembly 810 is aligned along a second rotational axis 828. As such, the second intermediate gear 816 and the second pinion 818 rotate about the second rotational axis 828. In FIG. 8A, the second rotational axis 828 is substantially perpendicular to the first rotational axis 824. As such, the first intermediate gear 804 and the second pinion 818 form a first set of bevel gears in the steering system 800. In the illustrated example of FIG. 8A, the second rotational axis 828 is orbital relative to the first rotational axis 824 so long as the second pinion 818 is engaged with the first intermediate gear 804 and the second intermediate gear 816 is engaged with the first pinion 814.

In the illustrated example of FIG. 8A, the motor shaft 811 is aligned along a third rotational axis 830 and, thus, the first pinion 814 is rotatable about the third rotational axis 830. The third rotational axis 830 is substantially perpendicular to the second rotational axis 828. As such, the first pinion 814 and the second intermediate gear 816 form a second set of bevel gears in the steering system 800.

In the illustrated example of FIG. 8A, the second gear assembly 812 is aligned along a fourth rotational axis 832. Accordingly, the third intermediate gear 820 and the third pinion 822 are rotatable about the fourth rotational axis 832. In FIG. 8A, the fourth rotational axis 832 is substantially perpendicular to the first rotational axis 824. As such, the input gear 802 and the third intermediate gear 820 form a third set of bevel gears in the steering system 800. In some examples, the fourth rotational axis 832 is also substantially perpendicular to the second rotational axis 828. The fifth rotational axis 234 of the output shaft 116 is substantially perpendicular to the fourth rotational axis 832 such that the third pinion 822 and the sector gear 220 form a fourth set of bevel gears in the steering system 800. In some examples, the steering system 800 includes axial position screws (e.g., the first axial position screw 244 of FIGS. 2-4 and 6-7, the second axial position screw 246 of FIGS. 2-5) to support the first gear assembly 810, the second gear assembly 812, and the output shaft 116.

Figure 8B:
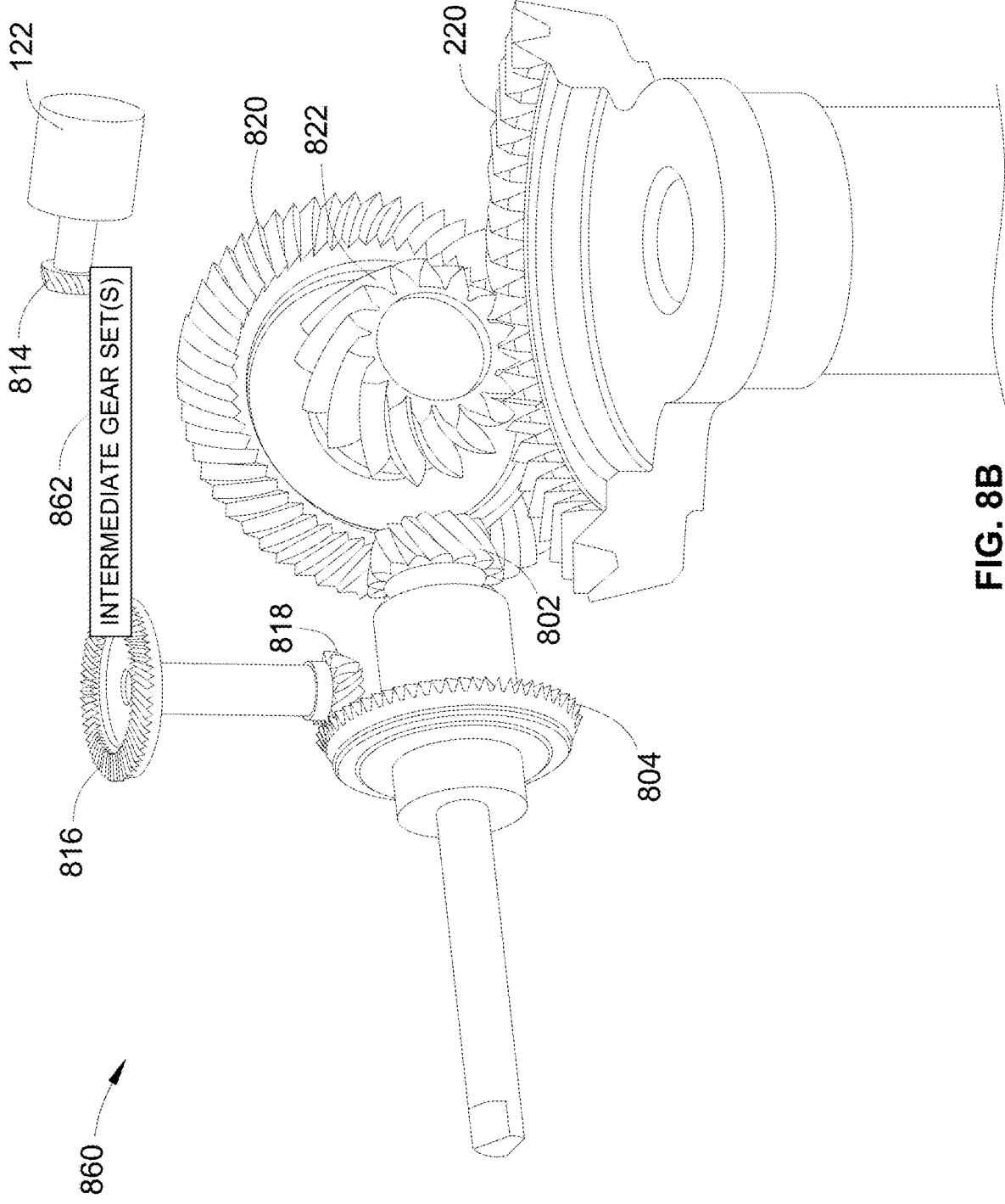
FIG. 8B illustrates a view of another example implementation of the portion of the steering system of FIG. 1.

FIG. 8B illustrates another example steering system 860 that includes one or more additional intermediate gear set(s) 862 in addition to the components of the steering system 800 of FIG. 8A. In the illustrated example of FIG. 8B, the additional intermediate gear set(s) 862 include(s) one or more intermediate gear(s) each of which are fixed to a respective pinion (e.g., similar to the second intermediate gear 216 and the third pinion 218 of the second gear assembly 206 (FIGS. 2A-2B)). As such, the intermediate gear set(s) 862 include an intermediate gear engaged with the first pinion 814 at one end and another pinion engaged with the second intermediate gear 816 at the other end to increase the gear reduction ratio and, thus, the torque delivered to the sector gear 220.

Accordingly, during operation, the motor 122 rotates the first pinion 814, which rotates an intermediate gear of the intermediate gear set(s) 862 that is engaged with the first pinion 814. In some examples, a pinion of the intermediate gear set(s) 862 that is fixed to the intermediate gear of the intermediate gear set(s) 262 is engaged with and rotates the second intermediate gear 816 and, in turn, the second pinion 818. As a result, the first intermediate gear 804, the input gear 802, the third intermediate gear 820, the third pinion 822, the sector gear 220, and the splines 124 rotate. In some examples, the pinion of the intermediate gear set(s) 862 that is fixed to the intermediate gear that is engaged with the first pinion 814 rotates another intermediate gear and, in turn, another pinion fixed thereto. In turn, the pinion can be engaged with the second intermediate gear 816 or another intermediate gear set. The quantity of intermediate gears and associated pinions that the additional intermediate gear set(s) 862 includes between the first pinion 814 and the second intermediate gear 816 depends on the vehicle in which the steering system 860 is to be implemented and/or the space available for the steering system 860 in the under-hood environment of the vehicle.

Figure 9:
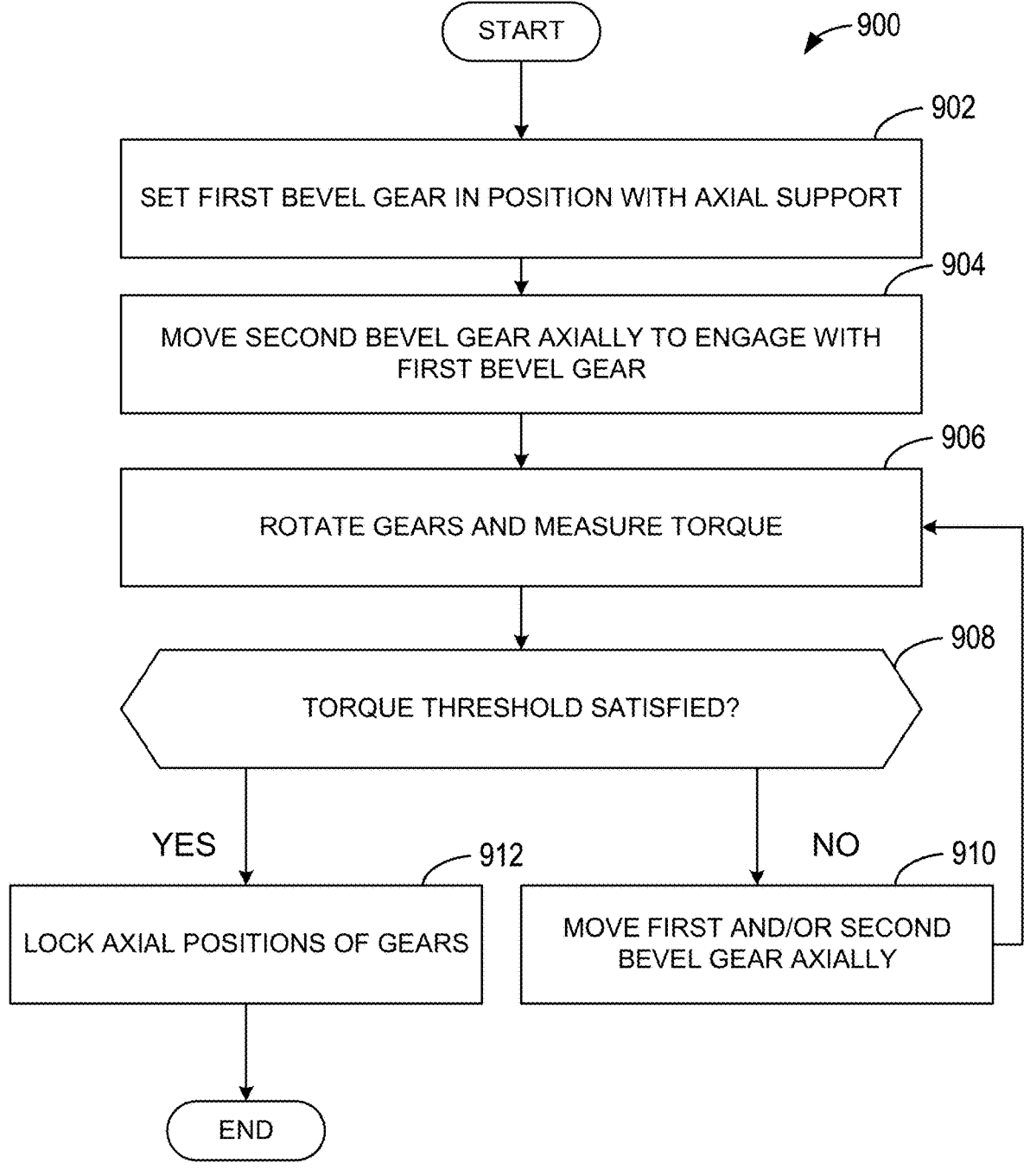
FIG. 9 is a flowchart representative of an example method to assemble steering systems in accordance with the teachings of this disclosure.

A flowchart representative of example machine readable instructions, which may be executed by programmable circuitry, and/or operations that may be carried out by a human to assemble the steering systems 200, 800 is shown in FIG. 9. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 9, many other methods of assembling the example steering systems 200, 800 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 9 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed, instantiated, and/or performed by programmable circuitry to assemble a steering actuator, such as the example steering systems 200, 260, 800, 860 of FIGS. 2A, 2B, 3, 4, 5, 6, 7, 8A, and 8B. The example machine-readable instructions and/or the example operations 900 of FIG. 9 begin at block 902, at which a first bevel gear (e.g., the sector gear 220) is set in a position and provided axial support. For example, the second axial position screw 246, the cover 242, and/or the spring 306 can position and support the output shaft 116 and, in turn, the sector gear 220.

At block 904, a second bevel gear (e.g., the second pinion 214 of FIGS. 2A-2B, the third pinion 822 of FIGS. 8A-8B) is moved axially to engage the first bevel gear. For example, the first axial position screw 244 can move the first gear assembly 204 of FIGS. 2A-2B and/or the second gear assembly 812 of FIGS. 8A-8B to engage the second pinion 214 and/or the third pinion 822 with the sector gear 220. In some examples, another axial control mechanism moves the first bevel gear.

At block 906, the first and second bevel gears are rotated and a torque that produced and/or results from the rotation is measured. For example, an input torque can be applied to the second bevel gear (e.g., the first gear assembly 204 of FIGS. 2A-2B, the second gear assembly 812 of FIGS. 8A-8B) and an output torque can be measured at the first bevel gear (e.g., the sector gear 220, the output shaft 116).

At block 908, the output torque is compared to a torque threshold (e.g., 1 Nm). For example, the torque threshold can be set based on the input torque and a gear reduction ratio between the second bevel and the first bevel. When the output torque satisfies (e.g., is greater than, is greater than or equal to) the torque threshold (e.g., block 908 returns a result of "YES"), the operations 900 skip to block 912. Otherwise, when the output torque does not satisfy (e.g., is less than or equal to, is less than) the torque threshold (e.g., block 908 returns a result of "NO"), the operations 900 proceed to block 910.

At block 910, the first bevel gear and/or the second bevel gear is/are moved axially (e.g., along their respective rotational axes) to adjust the engagement between the bevel gears and, in turn, the output torque that results from the rotation of the second bevel gear. For example, the first axial position screw 244 of FIGS. 2-4 and 6-7 and/or the second axial position screw 246 of FIGS. 2-5 can move the bevel gears. In some examples, another axial control mechanism moves the first bevel gear and/or the second bevel gear. After block 910 is complete, the operations 900 return to block 906.

At block 912, the respective axial positions of the bevel gears are locked. For example, the first axial position screw 244 and the second axial position screw 246 can be staked to the housing 104 or the sub-housing. Alternatively, the first axial position screw 244 and the second axial position screw 246 can be secured with a lock nut.

From the foregoing, it will be appreciated that example systems, apparatus, articles of manufacture, and methods have been disclosed that enable steering torque to be transferred to a pitman arm with only rotary movement. As a result, a lack of linear movement in the steering systems disclosed herein enables the steering systems to occupy a smaller amount of space, which provides versatility in the vehicles in which the steering systems can be utilized and/or the area in which the steering system can be positioned. Moreover, the steering systems disclosed herein generate sufficient power to steer heavier vehicles, such as trucks, while occupying the reduced space and utilizing electrical power assistance.

The foregoing examples of steering systems can be used with vehicles. Although each example steering system disclosed above has certain features, it should be understood that it is not necessary for a particular feature of one example steering system to be used exclusively with that example. Instead, any of the features described above and/or depicted in the drawings can be combined with any of the examples, in addition to or in substitution for any of the other features of those examples. Features of one example are not mutually exclusive to features of another example. Instead, the scope of this disclosure encompasses any combination of any of the features.

Example rotary steering systems are disclosed herein. Further examples and combinations thereof include the following:

Example 1 includes a vehicle steering system comprising an input gear fixed to an end of an input shaft, a first intermediate gear fixed to a first pinion, the first intermediate gear engaged with the input gear, a second intermediate gear fixed to a second pinion, the second pinion engaged with the first intermediate gear or a third intermediate gear, a motor fixed to a third pinion, the third pinion engaged with the second intermediate gear, the motor to rotate the first intermediate gear and the first pinion, a third gear fixed to a shaft, the third gear engaged with the first pinion, the third gear and the shaft to rotate as the first intermediate gear rotates, and a pitman arm coupled to the shaft, the pitman arm to couple to a drag link to turn wheels of a vehicle as the shaft rotates.

Example 2 includes the vehicle steering system of example 1, wherein the first intermediate gear and the first pinion are aligned along a first rotational axis, wherein the third gear and the shaft are aligned along a second rotational axis, and wherein the first rotational axis intersects the second rotational axis.

Example 3 includes the vehicle steering system of example 2, wherein the input gear is aligned along a third rotational axis substantially parallel to the first rotational axis.

Example 4 includes the vehicle steering system of example 1, wherein the first pinion and the third gear are bevel gears.

Example 5 includes the vehicle steering system of example 1, wherein the third gear is a sector gear.

Example 6 includes the vehicle steering system of example 1, wherein the shaft includes a first end and a second end facing opposite directions, wherein the third gear is positioned at the first end of the shaft and at least partially faces a same direction as the first end of the shaft.

Example 7 includes the vehicle steering system of example 6, wherein the pitman arm is coupled to the shaft at the second end of the shaft.

Example 8 includes the vehicle steering system of example 1, wherein the shaft includes an opening aligned along a rotational axis of the shaft, further including a positioning screw positioned in the opening, and a lock ring to couple the positioning screw to the shaft, the shaft axially movable with the positioning screw.

Example 9 includes the vehicle steering system of example 8, further including a washer positioned around the shaft and in contact with the lock ring.

Example 10 includes the vehicle steering system of example 1, wherein the first intermediate gear includes an opening aligned along a rotational axis of the first intermediate gear, further including a positioning screw positioned in the opening, and a lock ring to couple the positioning screw to the first intermediate gear, the first intermediate gear axially movable with the positioning screw.

Example 11 includes the vehicle steering system of example 1, further including a housing positioned around the shaft between the third gear and the pitman arm, and at least one roller bearing coupled to the housing and the shaft.

Example 12 includes the vehicle steering system of example 11, wherein the housing includes a projecting edge that projects away from a body of the shaft around which the housing is positioned, and wherein the third gear is positioned over the projecting edge.

Example 13 includes a vehicle steering system comprising an input shaft including an input gear, a first gear assembly including a first intermediate gear fixed to a first pinion, the first intermediate gear engaged with the input gear, a second gear assembly including a second intermediate gear fixed to a second pinion, the second pinion engaged with the first intermediate gear or a third intermediate gear, a output shaft including a third gear engaged with the first pinion, a motor fixed to a third pinion, the third pinion engaged with the second intermediate gear, the motor to provide torque that rotates the input shaft, the first gear assembly, the second gear assembly, and the output shaft, and a pitman arm coupled to the output shaft, the pitman arm to couple to a drag link to turn wheels of a vehicle as the output shaft rotates.

Example 14 includes the vehicle steering system of example 13, wherein the first gear assembly is aligned along a first rotational axis, wherein the output shaft is aligned along a second rotational axis, and wherein the first rotational axis and the second rotational axis intersect.

Example 15 includes the vehicle steering system of example 13, wherein the first gear assembly includes an opening aligned along a rotational axis of the first gear assembly, further including an axial position adjuster screw positioned in the opening, and a lock ring to couple the axial position adjuster screw to the first gear assembly.

Example 16 includes the vehicle steering system of example 13, further including a housing positioned around the output shaft between the third gear and the pitman arm, a first roller bearing coupled to the housing and the output shaft at a first end of the housing, and a second roller bearing coupled to the housing and the output shaft at a second end of the housing opposite the first end.

Example 17 includes an apparatus comprising an input shaft including an input gear, a first gear set including a first intermediate gear and a first pinion, the first intermediate gear engaged with the input gear, a second gear set including a second intermediate gear fixed to a second pinion, the second pinion engaged with the first intermediate gear, an output shaft including a sector gear and splines, the sector gear positioned at a first end of the output shaft, the splines positioned at a second end of the output shaft opposite the first end, the sector gear engaged with the first pinion, and a motor fixed to a third pinion, the third pinion engaged with the second intermediate gear, the motor to provide torque that rotates the input shaft, the first gear set, the second gear set, and the output shaft.

Example 18 includes the apparatus of example 17, further including a pitman arm coupled to the output shaft at the splines, the pitman arm to couple to a drag link to turn wheels of a vehicle as the output shaft rotates.

Example 19 includes the apparatus of example 17, wherein the first gear set is aligned along a first rotational axis, wherein the output shaft is aligned along a second rotational axis, and wherein the first rotational axis and the second rotational axis intersect.

Example 20 includes the apparatus of example 17, wherein the first gear set includes an opening aligned along a rotational axis of the first gear set, further including an axial adjuster screw positioned in the opening and coupled to the first gear set.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A steering apparatus comprising:
an input shaft including an input gear;
an output gear fixed to an output shaft;
a pitman arm coupled to the output shaft, the pitman arm to couple to a drag link to turn wheels of a vehicle as the output shaft rotates;

an intermediate gear set including a first intermediate gear and a second intermediate gear, the first intermediate gear in contact with the input gear, the second intermediate gear in contact with the output gear, the first intermediate gear to rotate with the input gear, the second intermediate gear to rotate with the first intermediate gear, the output gear to rotate with the second intermediate gear;
a spring positioned around the output shaft, the spring to exert a force on the output shaft in a direction towards the second intermediate gear;
a first roller bearing positioned around the output shaft; and
a second roller bearing positioned around the output shaft, the spring positioned between the first roller bearing and the second roller bearing.

2. The steering apparatus of claim 1, wherein the output gear and the second intermediate gear are bevel gears.

3. The steering apparatus of claim 1, wherein the intermediate gear set is a first intermediate gear set, further including:
a motor fixed to a pinion; and
a second intermediate gear set operatively coupled to the pinion and the first intermediate gear set to relay power from the motor to the first intermediate gear set.

4. The steering apparatus of claim 3, wherein the first intermediate gear set has a first rotational axis, wherein the second intermediate gear set has a second rotational axis, the first rotational axis substantially parallel to the second rotational axis.

5. The steering apparatus of claim 3, wherein the first intermediate gear set has a first rotational axis, wherein the second intermediate gear set has a second rotational axis, the first rotational axis substantially perpendicular to the second rotational axis.

6. The steering apparatus of claim 1, further including a cover positioned around the output shaft, the cover including a rim that projects from an end for the cover away from a rotational axis of the output shaft, the output gear positioned between the rim and the second intermediate gear.

7. A steering apparatus comprising:
an input shaft;
a pitman arm coupled to a drag link; and
an intermediate gear set to convert a rotation of the input shaft to a pivot movement of the pitman arm via movement consisting of rotational movement.

8. The steering apparatus of claim 7, further including an output shaft including a sector gear and splines, the sector gear positioned at a first end of the output shaft, the splines positioned at a second end of the output shaft opposite the first end, the splines engaged with the pitman arm, the sector gear engaged with the intermediate gear set.

9. The steering apparatus of claim 8, wherein the intermediate gear set is aligned along a first rotational axis, and wherein the output shaft is aligned along a second rotational axis that intersects the first rotational axis.

10. The steering apparatus of claim 8, wherein the intermediate gear set includes a first gear fixed to a second gear, the first gear engaged with an input gear fixed to the input shaft, the second gear engaged with the sector gear.

11. The steering apparatus of claim 10, further including:
a motor fixed to a third gear; and
a fourth gear fixed to a fifth gear, the third gear engaged with the fourth gear, the fifth gear engaged with the first gear.

12. The steering apparatus of claim 7, wherein the intermediate gear set includes an opening aligned along a rotational axis of the intermediate gear set, further including an axial adjuster screw positioned in the opening and coupled to the intermediate gear set.

13. The steering apparatus of claim 7, further including:
an output shaft coupled to the pitman arm, the intermediate gear set to convert the rotation of the input shaft to a rotation of an output gear, the rotation of the output gear to pivot the pitman arm;
a spring positioned around the output shaft, the spring to exert a force on the output shaft in a direction towards the intermediate gear set;
a first roller bearing positioned around the output shaft; and
a second roller bearing positioned around the output shaft, the spring positioned between the first roller bearing and the second roller bearing.

14. A steering apparatus comprising:
an input shaft;
an output shaft coupled to a pitman arm; and
an intermediate gear set to convert a first rotation of the input shaft to a second rotation of the output shaft with only rotational movement.

15. The steering apparatus of claim 14, wherein the intermediate gear set includes a first intermediate gear and a second intermediate gear, the first intermediate gear in contact with an input gear fixed to the input shaft, the second intermediate gear in contact with an output gear fixed to the output shaft, the first intermediate gear to rotate with the input gear, the second intermediate gear to rotate with the first intermediate gear, the output gear to rotate with the second intermediate gear.

16. The steering apparatus of claim 15, further including a third intermediate gear fixed to a fourth intermediate gear, the third intermediate gear in contact with the first intermediate gear.

17. The steering apparatus of claim 16, further including:
a fifth intermediate gear fixed to a sixth intermediate gear, the fifth intermediate gear in contact with the fourth intermediate gear; and
a motor fixed to a pinion in contact with the sixth intermediate gear.

18. The steering apparatus of claim 14, further including:
a cover positioned around the output shaft, the cover including a rim that projects from an end for the cover away from a rotational axis of the output shaft; and
an output gear fixed to the output shaft, wherein the output gear is positioned over the rim.

19. The steering apparatus of claim 14, further including:
an output gear fixed to an end of the output shaft, the output gear engaged with the intermediate gear set; and
a spring positioned around the output shaft, the spring to exert a force on the output shaft in a direction towards the intermediate gear set.

20. The steering apparatus of claim 14, further including:
a spring positioned around the output shaft, the spring to exert a force on the output shaft in a direction towards the intermediate gear set;
a first roller bearing positioned around the output shaft; and
a second roller bearing positioned around the output shaft, the spring positioned between the first roller bearing and the second roller bearing.

* * * * *